United States Patent [19]

Bornand et al.

[11] Patent Number: 5,697,162
[45] Date of Patent: Dec. 16, 1997

[54] ARRANGEMENT SERVING TO INDICATE THE DIRECTION OF A GIVEN GEOGRAPHIC LOCATION

[75] Inventors: Etienne Bornand, Boudry; Jean-Jacques Born, Morges, both of Switzerland

[73] Assignee: Asulab S.A., Bienne, Switzerland

[21] Appl. No.: 644,680

[22] Filed: May 8, 1996

[30] Foreign Application Priority Data

May 17, 1995 [CH] Switzerland ............... 1 454/95

[51] Int. Cl.$^6$ ............... G04B 47/06; G01C 17/14
[52] U.S. Cl. ............... 33/352; 33/320; 33/334; 33/354; 33/349; 368/14; 368/10
[58] Field of Search ............... 33/352, 320, 333, 33/334, 351, 354, 355 R, 356, 271, 268, 269, 349; 368/10, 11, 14, 15, 16, 17, 20, 21

[56] References Cited

U.S. PATENT DOCUMENTS

| | | | |
|---|---|---|---|
| 4,372,052 | 2/1983 | Wakim | 33/349 |
| 4,668,100 | 5/1987 | Murakami et al. | 33/354 |
| 5,173,709 | 12/1992 | Lauro et al. | 33/349 |
| 5,508,979 | 4/1996 | Eisenegger | 368/15 |
| 5,550,794 | 8/1996 | Born et al. | 33/271 |

FOREIGN PATENT DOCUMENTS

| | | |
|---|---|---|
| 2 474 161 | 7/1981 | France . |
| 2654857 | 5/1991 | France ............... 33/349 |
| 613 832 | 10/1979 | Switzerland . |

OTHER PUBLICATIONS

Patent Abstracts Of Japan vol. 6 No. 5 (P-097), 13 Jan. 1982 & JP-A-56 132513 (Komiyama Shoji KK.) 16 Oct. 1981.

*Primary Examiner*—Christopher W. Fulton
*Attorney, Agent, or Firm*—Griffin, Butler, Whisenhunt & Kurtossy

[57] ABSTRACT

The arrangement (42) according to the invention is formed by a watch comprising a dial (8) on which is shown a map (14) centered on a given geographic location, Mecca in particular. The arrangement (42) comprises a device (48) for indicating the direction of the terrestrial magnetic north and a device (16) enabling the angular positioning of the map in the general plane of the arrangement (42) corresponding to the plane of the dial (8). The different geographic regions shown on the map (14) are graphically arranged so that any point whatsoever of the contours of such regions substantially shows an angular spread (Ω), relative to a center of reference (22) corresponding to the above-mentioned given geographic location and to a reference direction (24) equal to the magnetic azimuth of the great circle passing through said point and the reference point (22) augmented by 180°. In another embodiment the angular spread is equal to the geographic azimuth of the great circle passing through said point and the reference point (22) augmented by 180°.

16 Claims, 3 Drawing Sheets

ARRANGEMENT SERVING TO INDICATE THE DIRECTION OF A GIVEN GEOGRAPHIC LOCATION

The present invention concerns an arrangement serving to indicate the direction of a given geographic location, in particular Mecca.

BACKGROUND OF THE INVENTION

There is known from patent document CH-613 832 G a watch including a magnetized hand rotatably mounted on an axis passing through the center of a dial on which is impressed a map of known representation (for example planar, cylindrical or conical projection from which originate the Mercator and Lambert representations in particular) of continents and interior seas. With the above-mentioned map there is associated a reference marker formed by a window in the dial enabling the positioning of the map relative to the direction of the terrestrial magnetic north. On the watch crystal is impressed a straight line segment originating from the center of the watch, that is to say from the rotation axis of the magnetized hand corresponding on the map to the position of Mecca.

In order to indicate the direction of Mecca from a given region and one shown on the map of the watch, it is provided that the dial serving as map support is rotatable around the rotation axis passing through Mecca on such map. Thus, the region in which the user is located is aligned onto the straight line segment mentioned above, then the watch is rotated in its general plane until the magnetized hand appears in the window serving as reference marker. The direction of Mecca is supposed to correspond to the direction given by the line segment provided on the watch crystal.

However, the arrangement described hereinbefore exhibits at least two major problems inducing a non-negligible error in the determination of the direction of a given geographic location, in particular, Mecca.

The first problem stems from the fact that the direction of the magnetic north from a given point of the globe does not correspond to the geographic north direction with which the above-mentioned reference marker on the map of the arrangement described hereinbefore is associated. Secondly, the angle formed between the geographic north and a given location relative to any other place whatsoever on a geographic map of standard representation does not correspond to the geographic azimuth of the given location relative to such other place.

Effectively, the representation of the great circle between two given geographic locations generally corresponds on a map of standard representation to a curve joining the two corresponding points to the two geographic locations. It will further be noted that the curvature of the curves joining various geographic locations to a given geographic location is variable. Thus, the arrangement described in patent document CH 613 832 G does not enable the precise indication of the direction of Mecca from any region whatsoever of the map provided on the dial of such watch.

The purpose of the present invention is to overcome the drawbacks and problems as mentioned above by furnishing an arrangement capable of indicating precisely the direction of a given geographic location, in particular Mecca, from a plurality of locations or geographic regions.

SUMMARY OF THE INVENTION

To this effect, the present invention has as an object an arrangement comprising:

first means for indicating the direction of the terrestrial magnetic north, means for the angular positioning of said arrangement in a general plane thereof relative to the direction of the terrestrial magnetic north, second means for indicating the direction of a first geographic location from at least one second geographic location at which said arrangement may be placed.

Such arrangement is characterized in that said second indicating means comprise a map on which are shown regions, countries and/or continents, such map being placed in said general plane of said arrangement and graphically arranged in a manner such that any point whatsoever of the contours of said regions, said countries and/or said continents substantially exhibits an angular shift relative to a center of reference corresponding to said first geographic location and to a reference direction of said map, equal to the geographic azimuth of the great circle passing through such point and said center of reference augmented by 180 degrees. In other words, the amount of angular shift is equal to the amount of said geographic azimuth plus 180 degrees.

Thanks to the characteristics of the arrangement according to the invention described hereinbefore, the direction defined by any point whatsoever of the regions shown on the map and the center of reference substantially determines, relative to the direction of the geographic north on the map, the geographic azimuth of the great circle connecting the geographic locations corresponding respectively to such point and to the center of reference.

In such embodiment, it is possible to correct the error originating from the magnetic declination by providing, according to the specific characteristics of the invention, that the first indicating means comprise an indicator of the north magnetic direction rotatably mounted around a rotation axis and arranged so as to be selectively aligned onto a plurality of reference marks defining a plurality of given magnetic declinations, the straight line passing through one of said marks corresponding to a nul magnetic declination and the axis of rotation in the general plane of the arrangement defining the reference direction mentioned above.

Accordingly, a user knowing the magnetic declination of the place where he is situated can simply orient the map by aligning the magnetic north direction indicator onto the corresponding reference marker with such magnetic declination.

The present invention also has as an object an arrangement comprising:

first means for indicating the direction of the terrestrial magnetic north, means for the angular positioning of such arrangement in a general plane thereof relative to the direction of the terrestrial magnetic north, second means for indicating the direction of a first geographic location from at least one second geographic location at which said arrangement may be placed.

Such arrangement is characterized in that said second indicating means comprise a map on which are shown regions, countries and/or continents, such map being placed in said general plane of said arrangement and graphically arranged so that any point whatsoever of the contours of said regions, said countries and/or said continents substantially exhibits an angular shift relative to a center of reference corresponding to the first geographic location and a reference direction of the map equal to the magnetic azimuth of the great circle passing through such point and the reference point augmented by 180 degrees.

In this latter object of the invention the magnetic declination is directly integrated into the graphic arrangement of the various regions, countries and/or continents shown on the map of the arrangement.

Thus, by aligning the reference direction on the map with the direction of magnetic north at the place where the user of the arrangement is situated, the direction of the predetermined geographic location from the place where the user is situated is given by a straight line connecting such place to the predetermined geographic location.

This second object of the invention shows the advantage of enabling the determination of the direction of a predetermined geographic location from a very large number of regions, countries or geographic point locations in a very precise manner without necessitating knowledge of the magnetic declination by the user of the arrangement according to the invention. However, it will be noted that the graphic representation of the map according to this second object is much further removed from the usual known representations than the graphic representation corresponding to the first object according to the invention described hereinbefore.

Other characteristics and advantages of the present invention will also be described hereinafter with the help of the following description prepared having reference to the attached drawings given by way of non-limiting examples.

DESCRIPTION OF THE PREFERRED EMBODIMENTS

Figure 1:
FIG. 1 shows a first embodiment of the invention.

With the help of FIGS. 1 and 2, there will be described hereinafter a first embodiment of an arrangement according to the invention. In an entirely non-limiting manner, such arrangement is associated with a watch 2 which can be worn on the wrist of the user. Such watch comprises a case 4 provided with a rotatable bezel 6. Watch 2 further comprises a dial 8 comprising a first display 10 serving in particular for the indication of the time and the date and a peripheral electronic display 12 serving to indicate the direction of the magnetic north. In order to do so, the watch 2 comprises within its case 4 an electronic compass (not shown). Display 12 is associated with the electronic compass mentioned above in order to show the user of the watch the direction of the magnetic north.

Dial 8 further comprises a map 14 on which are shown various countries, continents, interior seas, important lakes and/or rivers. Additionally, on map 14 are also shown various important cities by points serving to localize such cities within the various continents or countries shown on map 14.

With map 14 is associated a reference marker 16 serving for the angular positioning of map 14 which map is arranged in a general plane of watch 2.

According to the invention, the graphic arrangement of the various regions, countries and/or other geographical data is characterized in that any point whatsoever 20 representing any of such geographical data, in particular any point whatsoever of the contours of regions, countries and/or continents substantially exhibits an angular shift $\Omega$, relative to a reference center 22 and a reference direction 24 of map 14 equal to the value of the magnetic azimuth $\beta$ of the great circle passing through such point 20 and the reference center 22 augmented by 180°, that is to say that $\Omega=\beta+180°$.

Accordingly, the segment of the line starting from the point 20 and pointing in the direction of the reference center 22 indicates the direction of the geographic location corresponding to the center of reference as soon as the reference direction 24 coincides with the direction of the terrestrial magnetic north at the geographic location corresponding to such point 20. To obtain this, it is sufficient to orient angularly map 14 and, consequently, watch 2, so that the display 12 indicates that arrow 28 of the reference marker 16 which is parallel to the direction of reference 24, points in the direction of the terrestrial magnetic north.

In order to facilitate the indication of the direction of Mecca corresponding on the figures to the center of reference, there are provided two marks 30 and 32 placed on the rotatable bezel 6. Marks 30 and 32 define a line passing through the reference center 22. Mark 30 enables the definition of an imaginary line for the user of watch 2 passing through the geographic location in which he is situated and through the reference center 22. Once the rotatable bezel 6 is correctly positioned, the two reference marks 30 and 32 define the direction of Mecca from the place where said user is found. Evidently, other indicating means could be provided, in particular a rotatable crystal including an arrow.

It will be noted that in the graphic arrangement of the map 14 only the angular position is determinative, the radial position having no influence for the indication of the direction of the predetermined geographic location, Mecca in the present case. Thus, during the preparation of map 14 according to the invention, the designer will have a certain freedom in plotting the various curves and the various points provided. This degree of freedom will be used in order to give to different regions, countries, continents, seas and important lakes a contour evoking such various geographic data for the user. It will however be noted that such degree of freedom does not enable one to bestow an entirely standard and usual form to the various countries and continents as appear on FIG. 1, in particular for Africa.

In such first embodiment of the invention, map 14 integrates within its graphic arrangement the magnetic declination $\delta$ at any point (P on FIG. 2) of the map 14 shown on FIG. 1.

Figure 2:
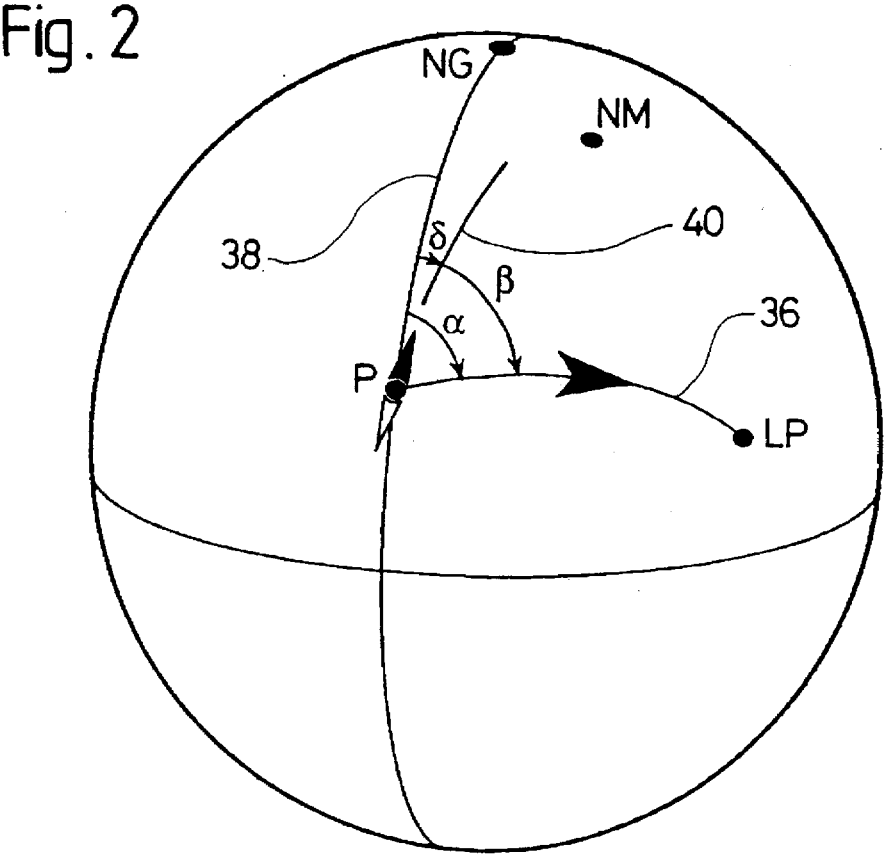
FIG. 2 shows schematically various parameters coming into play in the determination of the direction of a given geographic location.

On FIG. 2 is schematically shown the terrestrial sphere with the respective positions of the magnetic north NM and the geographic north NG. Next, there is shown any point P of the terrestrial globe and the position of a given geographic location LP. The great circle between the point P and the corresponding point at the given geographic location LP forms a curve 36. The great circle between point P and the geographic north corresponds to a segment of meridian 38. There has also been shown the direction of the terrestrial magnetic flux at point P by curve 40. The curves 36, 38 and 40 are comprised within the surface defining the terrestrial sphere.

Here it will be recalled that a great circle between two points of the terrestrial sphere is defined by the intersection of such terrestrial sphere with a plane containing such two points and the center of the terrestrial sphere. The great circle between two points corresponding to two given geographic locations determines the shortest distance between such two geographic locations.

The angle formed between curves 38 and 40 defines the magnetic declination δ at point P.

The angle formed between the curves 36 and 40 defines the magnetic azimuth β while the angle formed between the curves 36 and 38 define the geographic azimuth α of the point LP relative to the point P. It will be noted that α=β+δ, δ being variable as a function of the position of point P.

Figure 3:
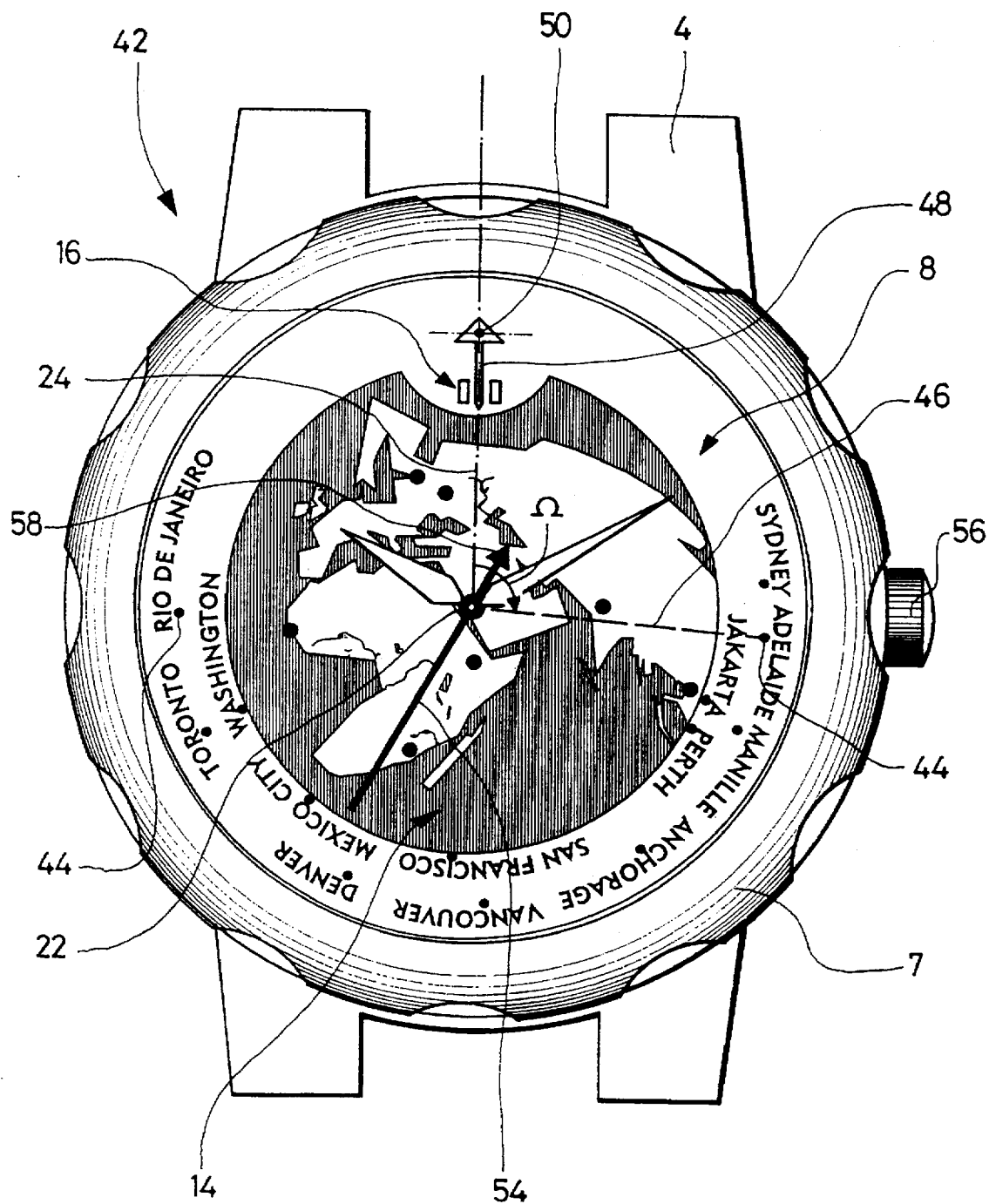
FIG. 3 shows schematically a variant embodiment of the first embodiment shown on FIG. 1.

On FIG. 3 is shown a variant of the first embodiment described hereinbefore. According to this variant, watch 42 also comprises a case 4, a bezel 7 and a dial 8 comprising a map 14 equivalent to that previously described. It will be noted that this map schematically shows basically Africa, Europe and a portion of Asia. On dial 8 is also shown a plurality of marks 44 corresponding to various important cities, not shown on map 14. However, it would also be possible to show important cities contained within map 14 by a mark 44 on the periphery of the dial 8.

The angle Ω defined by the reference direction 24 and the line segment 46 connecting the reference center 22 to any given marker 44 corresponds to the magnetic azimuth β of a geographic location corresponding to such marker relative to the geographic location corresponding to the center of reference 22 augmented by 180 degrees.

In order to align the reference direction 24 with the direction of magnetic north, there is provided an analog compass comprising an indicator 48 rotatably mounted on an axis 50 perpendicular to the dial 8. In order to determine the direction of Mecca from a geographic location or any region whatsoever, it is necessary to position indicator 48 in a manner such that it is aligned with a marker 16. It will be noted that the direction defined by the marker 16 and the rotation axis 50 in the plane of dial 8 is parallel to the reference direction 24.

In order to indicate the direction of Mecca, a hand 54 is provided operable with the help of crown 56. The direction of Mecca is given by arrow 58 when hand 54 is aligned with the place or the geographic region in which the user of the watch 42 is situated.

With the help of FIG. 4, there will be described here-after a second embodiment of the invention.

Figure 4:
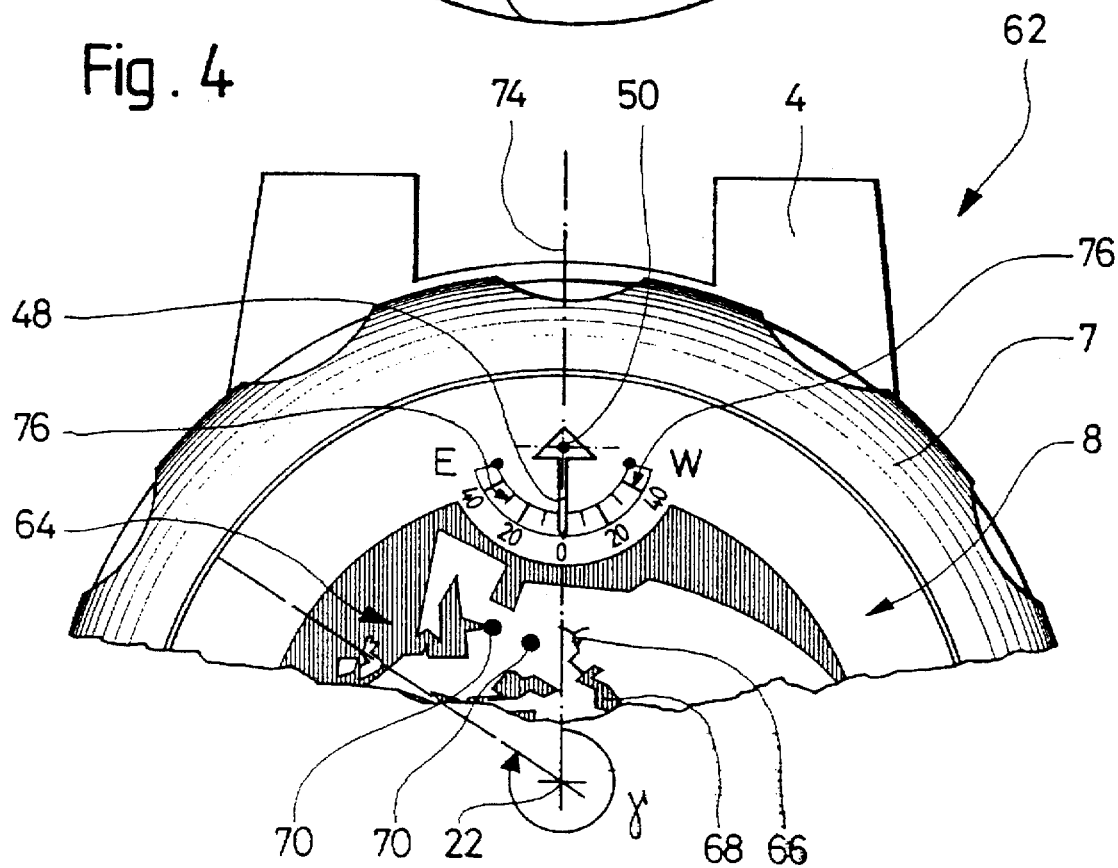
FIG. 4 shows partially a second embodiment of an arrangement according to the invention.

On FIG. 4 is partially shown a watch 62 including a case-band 4, a bezel 7 and a dial 8. On said dial 8 is shown a map 64 on which are shown various geographical regions, in particular various countries, continents, rivers 66, important lakes and interior seas 68. Additionally, on such map are also shown various important cities which are indicated by point reference marks 70 in a manner similar to the first embodiment described hereinbefore.

In this second embodiment of the invention, each point mark, each plot defining a river or each contour defining a geographic region whatsoever are graphically arranged on map 64 so that any point whatsoever corresponding to such point marks, such plots and/or such contours substantially exhibits an annular shift γ, relative to a center of reference 22 corresponding to a first geographic location, here Mecca, and to a reference direction 74 of the map 64, equal to the geographic azimuth α (FIG. 2) of the great circle passing through such point (P on FIG. 2) and the center of reference 22 augmented by 180 degrees. In mathematical terms, γ=α+180°.

Watch 62, serving in particular to indicate the direction of a geographic location corresponding to the center of reference 22 from any geographic region whatsoever shown on map 64 also includes an indicator 48 of the direction of the terrestrial magnetic north rotatably mounted on an axis 50 perpendicular to the general plane of the watch 62 in which the map 64 is placed. Such indicator 48 is associated with a bipolar magnet (not shown) placed under dial 8. The indicator 48 is fixed to the permanent bipolar magnet for which the magnetic axis of radial orientation relative to axis 50 is aligned in the terrestrial magnetic flux field traversing the region in which such permanent magnet is located.

A plurality of reference marks 76, concentrically arranged around axis 50, are provided on dial 8. Such plurality of reference marks 76 defines a plurality of predetermined magnetic declinations, the line passing through the reference mark zero and the axis 50 in the plane of dial 8 defining the reference direction 74. The magnetic declinations east (E) correspond to the reference marks arranged to the left of the reference mark zero, while the west (W) magnetic declinations are arranged to the right of the reference mark zero. It will be noted that when the magnetic declination δ (FIG. 2) has a nul value, indicator 48 indicates the direction of the geographic north.

In order to indicate the direction of the geographic location corresponding to the center of reference 22, means are also provided serving to define visually for the user of watch 62 a line between any point whatsoever of the map 64 and the center of reference 22. Such means are not shown on FIG. 4, given that they are for example similar to those described in the first embodiment of the invention.

In order to indicate in a precise manner the direction of the geographic location corresponding to the center of reference 22, the user must know the magnetic declination of the place where he is in order to align indicator 48 with the reference mark corresponding to such magnetic declination. Thus, the direction of reference 74 then corresponds to the direction of the geographic north. Thereby, the line passing through any point whatsoever of the map and the center of reference 22 indicates the direction of the location corresponding to such center of reference 22 when the user is in the geographic location corresponding to such point on map 64.

Finally, it will be noted that the second embodiment of the invention enables one to take into account the change over time of the magnetic declination δ and also of the local value of such magnetic declination δ.

What is claimed is:

1. An arrangement comprising:

first means for indicating the direction of the terrestrial magnetic north, means for the angular positioning of said arrangement in a general plane thereof relative to the direction of the terrestrial magnetic north, second means for indicating the direction of a first geographic location from at least one second geographic location at which said arrangement may be placed, said second indicating means comprising a map on which are shown regions, countries and/or continents, such map being placed in said general plane of said arrangement and graphically arranged in a manner such that any point whatsoever of the contours of said regions, said countries and/or said continents substantially exhibits an angular shift (γ) relative to a center of reference corresponding to said first geographic location and to a reference direction of said map, equal to the geographic azimuth (α) of the great circle passing through such point and said center of reference augmented by 180 degrees.

2. An arrangement as set forth in claim 1, said first indicating means comprising an indicator of the magnetic north direction rotatably mounted on a rotation axis and arranged to be selectively aligned with a plurality of reference marks defining a plurality of given magnetic declinations ($\delta$), the straight line passing through one of said reference marks corresponding to a null (0) magnetic declination and said rotation axis in said general plane of said arrangement defining said reference direction.

3. An arrangement as set forth in claim 2, said map also including the indication if rivers, of lakes and/or of interior seas graphically arranged so that every point defining such rivers, such lakes and/or interior seas substantially exhibits an angular shift ($\gamma$), relative to said center of reference and to said reference direction equal to the geographic azimuth ($\alpha$) of the great circle passing through such point and said reference point augmented by 180 degrees.

4. An arrangement as set forth in claim 2, said map also including the indication of cities respectively shown by point marks, each of such point marks substantially exhibiting an angular shift relative to said center of reference and to said reference direction equal to the geographic azimuth ($\alpha$) of the great circle passing through such point mark and said reference point augmented by 180 degrees.

5. An arrangement as set forth in claim 1, said map also including the indication of rivers, of lakes and/or of interior seas graphically arranged so that every point defining such rivers, such lakes and/or interior seas substantially exhibits an angular shift ($\gamma$), relative to said center of reference and to said reference direction equal to the geographic azimuth ($\alpha$) of the great circle passing through such point and said reference point augmented by 180 degrees.

6. An arrangement as set forth in claim 1, said map also including the indication of cities respectively shown by point marks, each of such point marks substantially exhibiting an angular shift relative to said center of reference and to said reference direction equal to the geographic azimuth ($\alpha$) of the great circle passing through such point mark and said reference point augmented by 180 degrees.

7. An arrangement as set forth in claim 1, wherein said second indicating means comprise means for defining a straight line between any point whatsoever of said map and said center of reference so as to indicate the direction of said first geographic location whenever said arrangement is substantially placed at the place corresponding to such point.

8. An arrangement as set forth in claim 1, wherein said first geographic location is Mecca.

9. An arrangement comprising:

first means for indicating the direction of the terrestrial magnetic north, means for the angular positioning of said arrangement in a general plane thereof relative to the direction of the terrestrial magnetic north, second means for indicating the direction of a first geographic location from at least one second geographic location at which said arrangement may be placed, said second indicating means comprising a map on which are shown regions, countries and/or continents, such map being placed in said general plane of said arrangement and graphically arranged so that any point whatsoever of the contours of said regions, said countries and/or said continents substantially exhibits an angular shift ($\Omega$) relative to a center of reference corresponding to said first geographic location and a reference direction of said map equal to the magnetic azimuth ($\beta$) of the great circle passing through such point and said reference point augmented by 180 degrees.

10. An arrangement as set forth in claim 9, wherein said first indicating means comprise an indicator of the terrestrial magnetic north direction rotatably mounted around a rotation axis and arranged to be aligned with a mark, the straight line passing through said mark and said rotation axis in the general plane of said arrangement defining said reference direction.

11. An arrangement as set forth in claim 10, said map also including the indication of rivers, of lakes and/or of interior seas graphically arranged so that every point defining such rivers, such lakes and/or such interior seas substantially exhibits an angular shift ($\Omega$) relative to said center of reference and to said reference direction equal to the magnetic azimuth of the great circle passing through such point and said reference point augmented by 180 degrees.

12. An arrangement as set forth in claim 10, said map (14) also including the indication of cities shown respectively by point marks, each of such point marks substantially exhibiting an angular shift ($\Omega$) relative to said center of reference and to said reference direction equal to the magnetic azimuth ($\beta$) of the great circle passing through such point mark and said reference point augmented by 180 degrees.

13. An arrangement as set forth in claim 9, said map also including the indication of rivers, of lakes and/or of interior seas graphically arranged so that every point defining such rivers, such lakes and/or such interior seas substantially exhibits an angular shift ($\Omega$) relative to said center of reference and to said reference direction equal to the magnetic azimuth of the great circle passing through such point and said reference point augmented by 180 degrees.

14. An arrangement as set forth in claim 9, said map (14) also including the indication of cities shown respectively by point marks, each of such point marks substantially exhibiting an angular shift ($\Omega$) relative to said center of reference and to said reference direction equal to the magnetic azimuth ($\beta$) of the great circle passing through such point mark and said reference point augmented by 180 degrees.

15. An arrangement as set forth in claim 9, wherein said second indicating means comprise means for defining a straight line between any point whatsoever of said map and said center of reference so as to indicate the direction of said first geographic location whenever said arrangement is substantially placed at the place corresponding to such point.

16. An arrangement as set forth in claim 9, wherein said first geographic location is Mecca.

* * * * *